_UNITED STATES PATENT OFFICE._

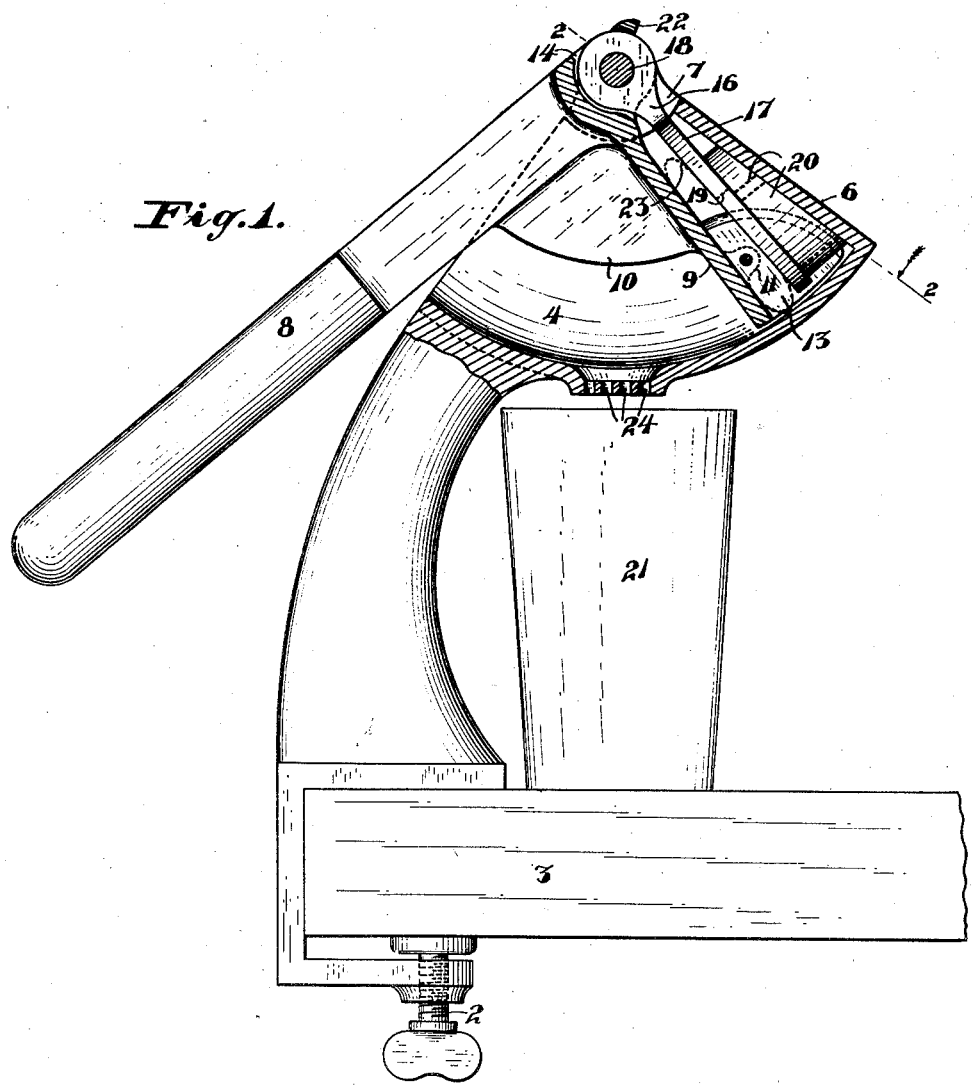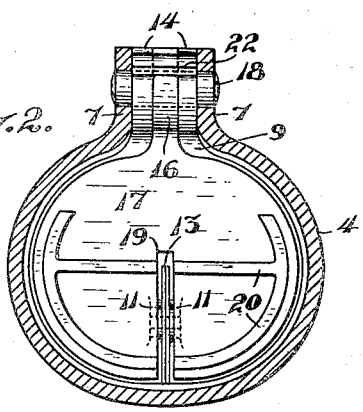

ABRAHAM I. BARNWELL AND PETER TORMEY, OF SAN FRANCISCO, CALIFORNIA.

LEMON-SQUEEZER.

1,113,594.  Specification of Letters Patent.  Patented Oct. 13, 1914.

Application filed January 6, 1914. Serial No. 810,541.

*To all whom it may concern:*

Be it known that we, ABRAHAM I. BARNWELL and PETER TORMEY, citizens of the United States, residing at San Francisco, in the county of San Francisco and State of California, have invented new and useful Improvements in Lemon-Squeezers, of which the following is a specification.

The object of the present invention is to provide a squeezer for lemons, limes, oranges, and the like, in which the process of cutting the lemon, squeezing the juice therefrom and draining it into a drinking glass or other vessel, can be performed in a single manual operation.

In the accompanying drawing, Figure 1 is a vertical section of our improved lemon squeezer; Fig. 2 is a cross-sectional view on the line 2—2 of Fig. 1.

Referring to the drawing, 1 indicates a standard adapted to be clamped by a screw 2 to the edge of a table 3, counter or the like. The upper end of said standard is formed in one piece with the wall of a receptacle 4, which is in the form of a short sector of a hollow ring, closed at one end 6, and open at the other end, and having at the top upwardly extending walls 7.

8 indicates a handle, which, at one end, is formed integral with a cutter plate 9 and with a web 10 connecting the handle and the cutter plate. On the side of the plate 9 remote from the web and handle are lugs 11 between which can be secured the rear portion of a knife 13, the rear edge of which rests against the cutter plate. Said handle has also formed in one piece therewith a fork 14 which extends between the walls 7. Received in said fork is an arm 16 extending from a presser plate 17. A pivot pin 18 extends through registering holes in said extension 16, fork members 14 and walls 7, and thereon said plate 17 and handle can swing independently.

The presser plate is formed with a central slot 19, in line with the arm 16, and extending inwardly past the middle from the outer edge thereof. There are also formed integral with said presser plate on the side remote from the cutter plate ribs 20 which abut against the end 6 of the receptacle. The lowermost portion of the curved wall of the receptacle is formed with drain holes 24 to permit the juice of the fruit to flow therethrough into a drinking glass 21 or other vessel suitably placed upon the table 3. Connecting the fork members of the handle 8 is a bridge 22, which, when the handle 8 has been turned back through a sufficient angle, impinges upon the arm 16, and causes the plate 17 to swing forwardly, discharging from the receptacle the squeezed lemon and seeds.

The whole device except the clamping screw is preferably made of aluminum, as being unaffected by fruit juices.

The parts being in the position shown in Fig. 1 and it being desired to extract the juice from a lemon, the handle is first raised and turned back on its pivot until the knife 13 is quite clear of the receptacle. This movement brings the presser plate to the front and discharges any previously squeezed lemon left in the receptacle 4. The operator inserts the lemon in the open end of the receptacle. He then returns the handle to its original position, by which action the knife 13 first comes in contact with the lemon, and both the lemon and the presser plate are moved rearwardly until the ribs 20 on the presser plate abut against the closed end 6 of the receptacle. A further rotation of the handle causes the knife 13 to sever the lemon, passing through the slot 19 in the presser plate, and, as the cutter plate approaches the presser plate, the lemon is squeezed therebetween, as shown in dotted lines at 23. The juice squeezed from the lemon flows down the bottom of the receptacle past the lower edge of the cutter plate and through the holes 24 into the drinking glass 21.

We claim:—

1. In a lemon squeezer, the combination of a suitable support, a receptacle supported thereon having a drain hole for the lemon juice, a cutter pivotally supported to swing through the open end of the receptacle, a handle for operating the cutter, and a presser plate having an elongated opening through which the cutter blade can move, and pivoted to move in the receptacle independently of the cutter.

2. In a lemon squeezer, the combination of a standard provided with means for securing it to the edge of a table or the like, and with a receptacle having a drain opening for fruit juices, and having a closed end and an open end, and walls extending upwardly and forming a pivot support, a handle and a cutter plate formed in one piece and pivotally connected to said walls, a knife secured to the cutter plate, and a presser plate pivotally supported on said walls and having an opening through which the knife can pass, and means extending from the side of the presser plate remote from the cutter plate and adapted to impinge against the closed end of the receptacle to arrest the presser plate.

In testimony whereof we have hereunto set our hands in the presence of two subscribing witnesses.

ABRAHAM I. BARNWELL.
PETER TORMEY.

Witnesses:
FRANCIS M. WRIGHT,
D. B. RICHARDS.